United States Patent [19]

Morrison

[11] Patent Number: 4,827,871
[45] Date of Patent: May 9, 1989

[54] PROCESSED PEAT POULTRY LITTER FOR CONFINED ENCLOSURES

[76] Inventor: David G. Morrison, 3150 Glen Oaks Ave., #302, White Bear Lake, Minn. 55110

[21] Appl. No.: 136,404
[22] Filed: Dec. 22, 1987
[51] Int. Cl.⁴ ............................................. A01K 67/00
[52] U.S. Cl. .......................................................... 49/1
[58] Field of Search ............................. 119/1; 427/212

[56] References Cited

U.S. PATENT DOCUMENTS

| | | |
|---|---|---|
| 3,675,625 | 7/1972 | Miller et al. ............................. 119/1 |
| 3,735,734 | 5/1973 | Pierce, III et al. ...................... 119/1 |
| 3,747,564 | 7/1973 | Bickoff et al. ........................... 119/1 |
| 3,765,371 | 10/1973 | Fisher ..................................... 119/1 |
| 3,921,581 | 11/1975 | Brewer .................................... 119/1 |
| 3,941,090 | 3/1976 | Fry .......................................... 119/1 |
| 3,980,050 | 9/1976 | Neubauer ............................... 119/1 |
| 3,983,842 | 10/1976 | Marion et al. .......................... 119/1 |
| 4,129,094 | 12/1978 | Stockel ................................... 119/1 |
| 4,159,008 | 6/1979 | Bavaveas ............................... 119/1 |
| 4,203,388 | 5/1980 | Cortigene et al. ...................... 119/1 |
| 4,217,858 | 8/1980 | Dantoni ................................. 119/1 |
| 4,258,660 | 3/1981 | Pris et al. ............................... 119/1 |
| 4,263,873 | 4/1981 | Christianson .......................... 119/1 |
| 4,305,345 | 12/1981 | Otoguro ................................. 119/1 |
| 4,386,579 | 6/1983 | Harsh et al. ............................ 119/1 |
| 4,506,628 | 3/1985 | Stockel ................................... 119/1 |
| 4,519,340 | 5/1985 | Dickey ................................... 119/1 |
| 4,570,573 | 2/1986 | Lohmon ................................. 119/1 |
| 4,591,581 | 5/1986 | Crampton et al. ................. 119/1 X |
| 4,607,594 | 8/1986 | Thacker ................................. 119/1 |
| 4,618,496 | 10/1986 | Brasseur ............................ 119/1 X |
| 4,622,920 | 11/1986 | Goss ....................................... 119/1 |
| 4,657,881 | 4/1987 | Grampton et al. ..................... 119/1 |
| 4,664,064 | 5/1987 | Lowe ...................................... 119/1 |
| 4,671,208 | 6/1987 | Smith ..................................... 119/1 |
| 4,686,937 | 8/1987 | Rosenfeld .............................. 119/1 |
| 4,704,989 | 11/1987 | Rosenfeld .............................. 119/1 |
| 4,721,059 | 1/1988 | Lowe et al. ............................ 119/1 |

Primary Examiner—Gene Mancene
Assistant Examiner—R. Thomas Price
Attorney, Agent, or Firm—Orrin M. Haugen; Thomas J. Nikolai; Frederick W. Niebuhr

[57] ABSTRACT

A poultry litter is disclosed in two preferred embodiments: compacted peat in fragments ranging in nominal diameter from ⅛ of an inch to 1½ inches, and compacted peat fragments combined with a conventional litter material such as wood shavings, with the peat accounting for at least ten percent of the mixture weight. In this latter case, the peat fragments preferably have nominal diameters no greater than ⅛ of an inch. Preferably the peat is of the reed sedge type, with a pH of from 3.5 to 4.5, and a moisture content of no more than fifty percent by weight. For enhanced capacity to absorb moisture and dust control, the peat fragments are provided with a coating of a feed grade petroleum based oil, vegetable oil or animal fat.

21 Claims, 2 Drawing Sheets

PROCESSED PEAT POULTRY LITTER FOR CONFINED ENCLOSURES

BACKGROUND OF THE INVENTION

This invention relates to animal bedding or litter materials, and more particularly to a poultry litter particularly well suited for use in confined enclosures.

Currently, the preferred materials for use as poultry litter are low cost, high in fiber and highly moisture absorbent, for example wood shavings, saw dust, peat hulls, oat hulls, sunflower hulls, ground corn cobs, and rice hulls. Of these, the most commonly used is perhaps dried wood shavings. When used as a bedding for poultry, these materials must serve two needs: absorbing moisture from the poultry droppings, and minimizing the release of gaseous ammonia.

These requirements are now more critical in view of present day methods of producing poultry. In particular, advanced breeding techniques and improved feeds result in more rapid growth of the birds, and they are raised in more confined or restricted areas than were previously employed. Both factors increase the level of stress within poultry raising enclosures, and result in higher levels of moisture and ammonia gas. The moisture alone is a significant problem, and the increased ammonia lowers the ability of the birds to resist respiratory disease, a major cause of poultry mortality.

The above-mentioned commonly employed litter materials are effective to a degree. However, they have a tendency to compact, reducing their capacity to release moisture and increasing the formation and release of ammonia gas. To counter these problems, the litter can be regularly stirred, for example weekly. However, the stirring itself releases substantial amounts of ammonia, requiring increased air circulation through the poultry enclosure. In cold weather, the air must be heated, further increasing the production cost. Of course, the stirring operation itself is an added cost of labor.

Therefore, it is an object of the present invention to provide a poultry litter with improved moisture absorption capability as compared to present materials.

Another object is to provide a poultry litter which reduces the release of ammonia gas and has improved aeration for a more stable, safer release of moisture and ammonia gases.

Another object is to provide a poultry litter which requires little or no periodic stirring to effect satisfactory moisture and ammonia release.

Yet another object is to provide a process for manufacturing an improved, low cost poultry litter.

SUMMARY OF THE INVENTION

To achieve these and other objects, there is provided a poultry litter for use in confined enclosures. The poultry litter consists essentially of compacted peat formed into fragments of random shape and with nominal diameters of less than about 1¾ inches. The fragments have a pH of less than seven, and a moisture content of at most fifty percent by weight.

Preferably, the nominal diameters of the fragments are within a range from about ⅛ of an inch to about 1½ inches. The preferred peat is a reed sedge peat with a pH of less than 5.5, and preferably within a range of from 3.5 to 4.5. The peat fragments can be provided with a coating over their surfaces. The coating consists essentially of one or more of the following feed grade components: petroleum based oil; a vegetable oil, and an animal fat. More preferably, the coating is one or more of the following: mineral oil, propylene glycol, soy oil, corn oil, peanut oil, cotton seed oil, animal fat and tallow.

Another feature of the invention resides in a poultry litter consisting essentially of a high fiber moisture absorbent mixture of compacted peat and one or more of the following high fiber components: wood shavings, saw dust, peanut hulls, oat hulls, sunflower hulls, ground corn cobs, and rice hulls. The compacted peat is formed in fragments having a moisture content of at most fifty percent by weight and a pH of less than seven. The peat fragments comprise at least ten percent of the litter by weight.

Preferably, the peat fragments have nominal diameters of at most ⅛ of an inch. A surface coating of one or more of the aforementioned oils is preferably applied to the peat fragments.

Another aspect of the present invention is a process for manufacturing an animal litter, including the steps of:

drying compacted peat to reduce its moisture content to at most fifty percent by weight;

fracturing the peat into fragments of random size and shape;

separating the peat to remove the ones of said fragments having nominal diameters greater than a selected maximum value; and mixing the remaining particles to provide a substantially random distribution of said fragments.

Prior to mixing, the fragments preferably are further separated to remove a second group of the fragments with nominal diameters less than a selected minimum value. To enhance moisture absorption of the fragments, a coating preferably is applied during the mixing step. The coating can be a feed grade petroleum based oil, vegetable oil or animal fat. Preferably the coating consists of one or more of the following constituents: mineral oil, propylene oil, soy oil, corn oil, peanut oil, cotton seed oil, and tallow. Prior to application, the coating is heated to a temperature of at least 75° F.

In one preferred process, the peat fragments are separated such that the maximum diameter is about 1½ inches, and the minimum nominal diameter is about ⅛ of an inch. Alternatively, the maximum diameter can be ⅛ of an inch, and the peat fragments are combined with a fibrous mix consisting essentially of particles of at least one of the following high fiber components: wood shavings, saw dust, peanut hulls, oat hulls, sunflower hulls, ground corn cobs, and rice hulls.

The poultry litter of the present invention has improved moisture absorption compared to currently used materials. In fact, one surprising finding is a substantially enhanced moisture absorption when the oil coating is applied to the peat fragments. Peat poultry litter has been found to absorb from three to five times more moisture (depending upon initial moisture percentage) than conventional litters, resulting in a longer life for the litter. Augmenting the increased absorption capacity is an increased ability to release moisture rapidly, due to the random size distribution of the peat fragments.

It is believed that the relatively low pH of the peat poultry litter enables it to tie up the nitrogen in poultry droppings, in a manner to substantially reduce the nitrogen combining with air and moisture and resultant release of ammonia gases. This, combined with the greater absorption capacity and improved moisture release, substantially reduces the need for periodic stirring of the litter and reduces labor cost.

When composed entirely of peat, the litter is free-flowing and easily spread to the desired level within the enclosure. Further, the peat is an approved feed ingredient having nutrient value. Poultry can consume the litter without the digestive disturbance that results from consuming quantities of conventional litter.

Thus, there is disclosed in accordance with the present invention a low cost, peat based poultry litter with substantially improved moisture absorption, moisture release and ammonia release characteristics, and resultant longer life. Use of the litter increases comfort for the poultry and reduces disease and mortality rates, for improved gains per pound of feed. Costs are further reduced by reducing the amount of required air circulation throughout the poultry enclosure, and heating of air as well. Moreover, when removed from the enclosure, the spent peat poultry litter can be used as an organic fertilizer or animal feed ingredient, further enhancing its value as compared with conventional litter materials.

IN THE DRAWINGS

For a further understanding of the above and other features and advantages, reference is made to the following detailed description and the drawings, in which.

DETAILED DESCRIPTION OF THE PREFERRED EMBODIMENTS

Figure 1:
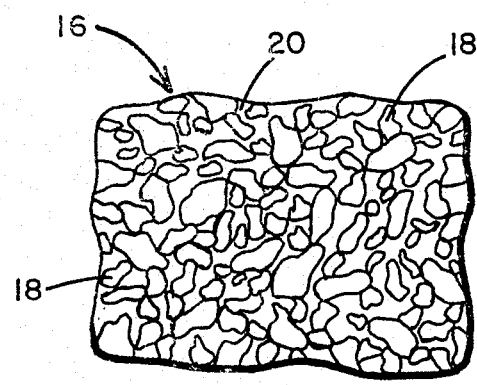
FIG. 1 is a diagrammatic view illustrating part of a bed of processed peat poultry litter manufactured in accordance with the present invention.

Turning now to the drawings, there is shown in FIG. 1 a bed o poultry litter 16 particularly well suited for confined enclosures used in poultry raising operations. Litter 16 consists of multiple fragments 18 of peat, particularly of a type known as reed sedge peat. This type of peat has a pH lower than water, typically less than 5.5 but preferably in the range of from 3.5 to 4.5. The preferred peat also is low in ash, e.g. six to fifteen percent by weight. The peat is compact, and broken into multiple particles or fragments of random size and shape. The size of the fragment ranges about ⅛ of an inch to 1½ inches in nominal diameter. Fragments 18 preferably have a moisture content of at most fifty percent by weight to improve their capacity to absorb moisture. The random sizes and shapes are preferable for creating numerous air passages 20 throughout the litter, which enhances aeration and provides for a desired steady release of moisture from the bed.

In use, fragments 18 are spread over the entire floor of a poultry enclosure, at an appropriate depth, for example one to six inches. Compared with conventional litter materials such as wood shavings or saw dust, fragments 18 are relatively easy to arrange in a constant depth over the enclosure floor.

To further enhance moisture absorption, fragments 18 preferably are provided with a surface coating of a feed grade oil, generally a petroleum based oil, a vegetable oil or an animal fat. Suitable examples include mineral oil, propylene glycol, soy oil, corn oil, peanut oil, cotton seed oil and tallow. When provided with this coating, fragments 18 exhibit an enhanced moisture absorption rate. The capacity is anywhere from three to five times that of conventional litter materials, depending upon the moisture level of the peat sod.

Figure 2:
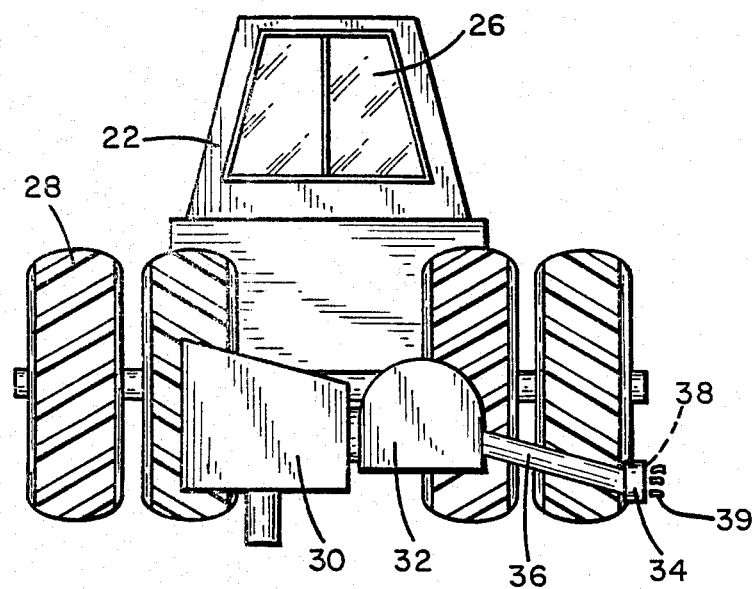
FIG. 2 is a rear end elevation of a tractor equipped with peat harvesting equipment.
Figure 3:
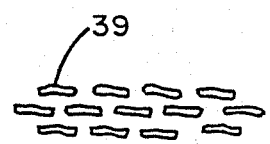
FIG. 3 is a top plan view illustrating harvested peat.

FIGS. 2 and 3 illustrate the harvesting of peat for eventual use as a poultry litter. Initially, a peat bog is leveled, contoured, ditched and drained, as is known in the peat utilization art. As previously mentioned, this is preferably a bog of reed sedge peat. Harvesting of the peat is accomplished with a tractor 22 shown to include a rear window 26 and four rear wheels 28. Peat sod cutting apparatus is mounted to the rear end of the tractor, and includes a trenching apparatus 30, a compacting and hydraulic device 32, and an orificed peat extrusion manifold 34. Trenching apparatus 30 cuts a trench into the bog approximately six inches wide and from eighteen inches to thirty-six inches deep and grinds or chews up the long peat fibers. Hydraulic device 32 compacts the peat and moves it to extrusion manifold 34 through a tapered screw auger 36, thus compacting the peat as it moves the peat. The peat is further compacted as it is extruded in conventional meat grinder fashion through a series of circular extrusion openings 38 along the end wall of extrusion manifold 34.

As it is extruded, the peat drops upon the field in random sized cylinders or peat sods 39 (see FIG. 3), of a diameter typically in the range of from about three inches to about six inches, and a length from two inches to ten inches. The extrusion openings can be other shapes, for example square, to provide lengths of peat with different cross-sectional shapes.

Immediately after harvesting, the peat characteristically has a moisture content of from about seventy percent to ninety percent by weight. The extruded peat sods are dried, for example by solar drying including turning of the peat sods until the moisture level is reduced to at most fifty percent of the peat sod weight, and preferably in the range of from twenty percent to fifty percent. The required amount of drying, and final appropriate moisture content, depends on the ability of the peat to release moisture.

Figure 4:
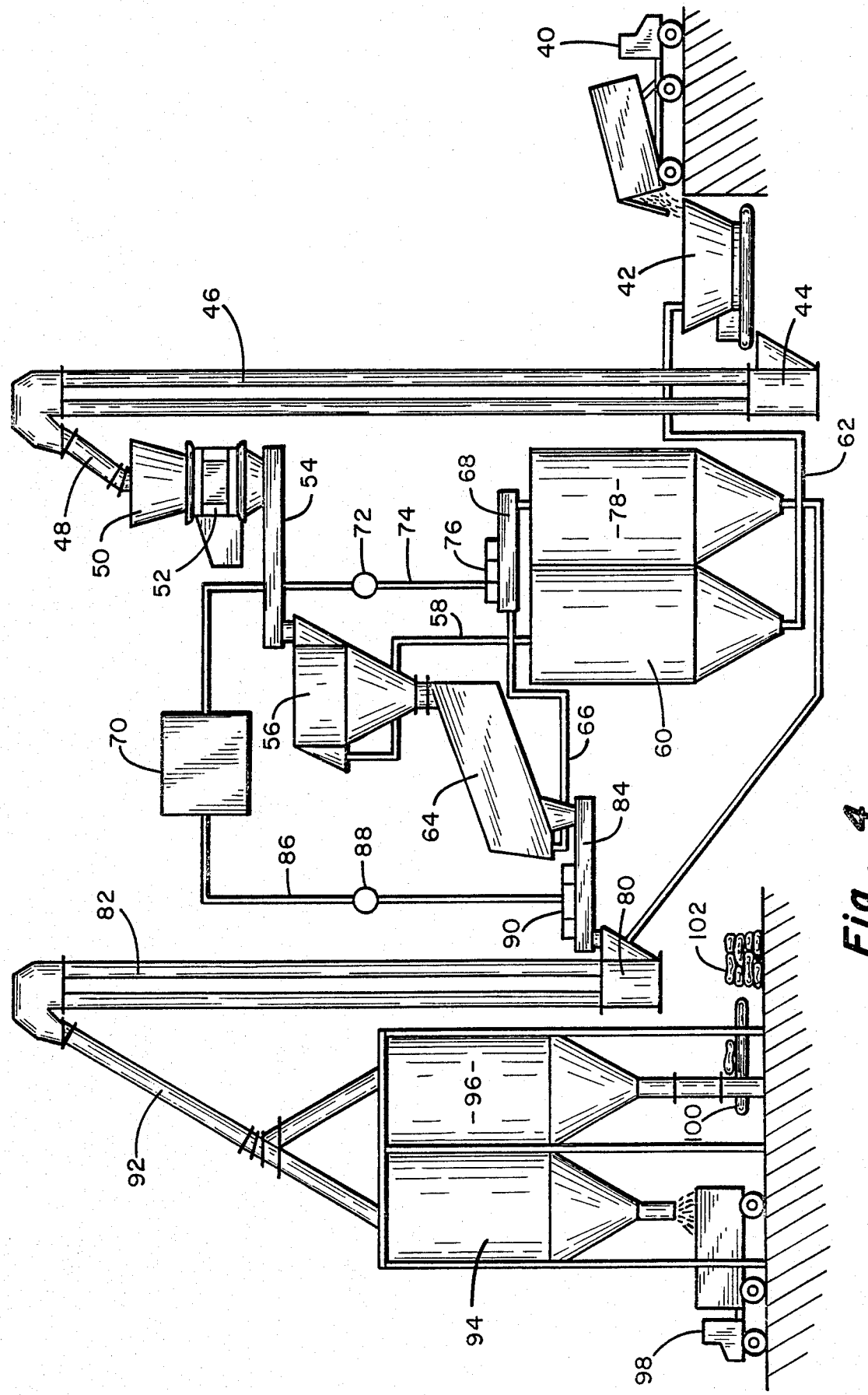
FIG. 4 is a schematic view illustrating the presently preferred process for manufacturing the poultry litter shown in FIG. 1.

Following drying, the peat is harvested, in the form of sod pieces or chunks, and placed in a stock pile near the bog, or delivered by a truck 40 to a processing facility such as that illustrated in FIG. 4. From truck 40, the chunks of peat are loaded into a receiving hopper 42, then provided to a bin 44 at the bottom of an elevator 46. The chunks are elevated and provided through a conduit 48 to a hopper 50 of a fracturing crusher 52. Crusher 52 can be a Soft Rock Hammermill, a roller crusher or other suitable device. In crusher 52, the chunks of peat are broken down into multiple, substantially smaller peat fragments. A conveyor 54 transports the peat fragments to a reel scalper 56, where oversize fragments are separated and carried through a conduit 58 to a receiving bin 60 for oversize fragments. A conduit 62 is provided beneath bin 60 for transporting the oversize fragments back to receiving hopper 42, where they can later be elevated and provided to crusher 52 once again.

The remaining fragments, having nominal diameters equal to or less than a desired maximum value, are provided to a vibrator separator 64. In the vibrator separator, fine fragments having a diameter of less than a selected minimum value are separated and provided over a conduit 66 to a mixer auger 68. When contained in the mixer auger, the fine fragments are coated with oil that has been heated to a temperature of 75°–150° F. (depending on the type of oil, and particularly its flash point) in an oil supply container 70, and transported by an oil pump 72 through a fluid conduit 74 to a bank 76 of oil injector nozzles. The oil stored in container 70 can be any feed grade petroleum based oil, vegetable oil or animal fat. Suitable examples include mineral oil, propylene glycol, soy oil, corn oil, peanut oil, cotton seed oil and tallow. Depending on the dust content of the fragments, oil is sprayed upon them in the amount of from one-half percent to five percent, by weight, of the oil/peat mixture.

Following the coating process, fine fragments are stored in a receiving bin 78, from which they can be provided to an elevator receiving bin 80 of a second elevator 82.

The remaining peat fragments in vibrator separator 64 have nominal diameters within a desired range from the minimum value to the maximum value. The preferred minimum value is ⅛ of an inch. The preferred maximum nominal diameter is 1½ inches, although a maximum diameter of 1¾ inches, and even two inches, can in some cases be satisfactory. From the vibrator separator, these remaining fragments are supplied to a second mixer auger 84. As they are mixed, oil from container 70 is supplied over a fluid conduit 86, by a pump 88, to a second bank 90 of injector nozzles, and the fragments are coated with oil in much the same manner as the fine fragments are coated when in mixer auger 68.

The output of mixer auger 84 is supplied to bin 80 of elevator 82. Of course, the process is controlled such that only the output of either mixer auger 84, or bin 78, is supplied to receiving bin 80 at any given time. Elevator 82 provides the contents of bin 80 to a split conduit 92, thus to load some of the peat fragments into a bulk storage bin 94 and the remaining fragments into a bag storage bin 96. Bulk fragments can be loaded onto a receiving truck 98, while the fragments in storage bin 96 are supplied to a bagging apparatus and conveyor 100 utilized to package the litter into bags 102. Fine or coarse fragments, loaded into truck 98, can be hauled to a mixing location (not illustrated) to be combined with wood shavings or another suitable conventional litter material.

Figure 5:
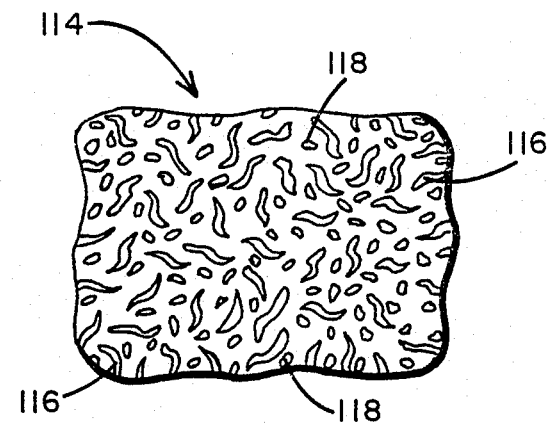
FIG. 5 is a diagrammatic view illustrating part of a bed of an alternative poultry litter manufactured in accordance with the present invention.

Peat fragments coated at mixer auger 84 are provided to bins 94 and 96, in the form illustrated in FIG. 1. Fine particles, however, are preferably combined with one of the conventional litter materials, for example wood shavings. A litter 114 of dried wood shavings 116 and fine peat fragments 118 is illustrated in FIG. 5. Preferably the peat fragments constitute from about ten to fifty percent of the weight of the litter. Fragments 118 are coated with oil as previously described, and have nominal diameters of at most about ⅛ of an inch. The addition of peat fragments 118 to wood shavings 116 enhances the moisture absorbing capacity of litter 114 as compared to a litter composed of wood shavings alone. The peat fragments tend to be much smaller in size than the wood shavings, and the random overall particle size distribution contribute to added aeration throughout the litter. Litter 114 also is easier to spread into the desired constant depth, and of course the bed provides a means of utilizing peat fragments too small for use in litter 16. It should be noted that while wood shavings are the exemplary fibrous material combined with peat in FIG. 5, other conventional litter materials would suffice, such as saw dust, peanut hulls, oat hulls, sunflower hulls, corn cobs, or rice hulls. In each case, the addition of peat enhances moisture absorption and moisture release through aeration and resistance to compacting, and further reduces the release of ammonia gases as compared to a litter of the high fiber material alone.

Thus, peat when processed in accordance with the present invention provides a cost effective poultry litter, whether used alone or combined with wood shavings or another conventional litter material. The enhanced moisture absorption and release of moisture and ammonia gases contribute to the life of the litter bed and therefore reduce the necessary labor, both in terms of reduced stirring and less frequent litter bed replacement. The need for air circulation is reduced, further lowering production costs. The poultry is raised in more comfortable surroundings and the potential for disease, particularly respiratory problems from overabundance of ammonia and moisture, is minimized. After use as litter, the peat is easily removed from the enclosure and can be used as an organic fertilizer.

What is claimed is:

1. A poultry litter for use in confined enclosures, consisting essentially of:
   compacted to a density to reduce formation of duct when agitating or otherwise disturbing the peat, said peat being peat size and formed into fragments of random size and shape and with nominal diameters from about ⅛ of an inch to of less than about 1¾ inches, said fragments having a pH of less than seven and a moisture content of at most fifty percent by weight.

2. The poultry litter of claim 1 wherein:
   said fragments have nominal diameters ranging from about ⅛ of an inch to about 1½ inches.

3. The poultry litter of claim 2 wherein:
   said peat is reed sedge peat and has a pH of less than 5.5.

4. The poultry litter of claim 3 wherein:
   said peat has a pH within the range of from 3.5 to 4.5.

5. The poultry litter of claim 2 further including:
   a coating provided over exposed surfaces of said fragments, said coating consisting essentially of at least one of the following components: a feed grade petroleum-based oil, a feed grade vegetable oil, and feed grade animal fat.

6. The poultry litter of claim 5 wherein:
   said coating consists essentially of at least one of the following components: mineral oil, propylene glycol, soy oil, corn oil, peanut oil, cotton seed oil, and tallow.

7. A poultry litter for use in confined enclosures, consisting essentially of:
   a highly moisture absorbent, high fiber by-product mixture of food processing; and
   at least ten percent by weight peat compacted to a density substantially above its naturally occurring density to reduce dust formation when disturbing the peat, said peat being formed in fragments having a moisture content of at most fifty percent by weight and a pH of less than seven.

8. The poultry litter of claim 7 wherein:
   said by-product mixture consists essentially of one or more of the following high fiber components:

wood shavings, saw dust, peanut hulls, oat hulls, sunflower hulls, ground corn cobs, and rice hulls.

9. The poultry litter of claim 8 wherein:
said fragments of peat have nominal diameters of at most ⅛ of an inch.

10. The poultry litter of claim 9 further including:
a coating provided over exposed surfaces of said fragments and consisting essentially of at least one of: a feed grade petroleum based oil, a feed grade vegetable oil, and a feed grade animal fat.

11. The poultry litter of claim 10 wherein:
said coating consists essentially of one or more of the following: mineral oil, propylene glycol, soy oil, corn oil, peanut oil, cotton seed oil, and tallow.

12. A process of manufacturing an animal litter, including the steps of:
compacting peat to a density substantially above its naturally occurring density to reduce dust formation due to disturbing the peat, and drying the peat to reduce its moisture content to at most fifty percent by weight;
fracturing the peat into fragments of random size and shape;
separating the peat to remove a first group of said fragments having nominal diameters greater than a selected maximum value; and
mixing the remaining ones of said fragments to provide a substantially random distribution of said fragments.

13. The process of claim 12 including the further step of:
prior to mixing said remaining fragments, further separating the peat to remove a second group of said fragments having nominal diameters of less than a selected minimum value.

14. The process of claim 13 including the further step of:
applying a coating to the surfaces of said fragments, said coating including at least one of the following feed grade constituents: a petroleum based oil, a vegetable oil, and an animal fat.

15. The process of claim 14 wherein:
said coating consists essentially of one or more of the following constituents: mineral oil, propylene glycol, soy oil, corn oil, peanut oil, cotton seed oil, and tallow.

16. The process of claim 14 further including the further step of:
heating said coating to a temperature of at least 75° F. prior to applying said coating.

17. The process of claim 14 wherein:
said steps of applying said coating and mixing said fragments are performed simultaneously.

18. The process of claim 13 wherein:
said maximum value is 1½ inches, and said minimum value is ⅛ of an inch.

19. The process of claim 12 including the further step of:
combining said fragments in said random distribution with a highly moisture absorbent, high fiber by-product mixture of food processing in said random distribution.

20. The process of claim 19 including the further step of:
applying a surface coating to said fragments, said coating consisting essentially of at least one of the following feed grade constituents: a petroleum based oil, a vegetable oil, and an animal fat.

21. The process of claim 20 wherein:
said minimum value is ⅛ of an inch.

* * * * *

UNITED STATES PATENT AND TRADEMARK OFFICE
CERTIFICATE OF CORRECTION

PATENT NO. : 4,827,871

DATED : May 9, 1989

INVENTOR(S) : David G. Morrison

It is certified that error appears in the above-identified patent and that said Letters Patent is hereby corrected as shown below:

Column 6, Claim 1 should read:

1. A poultry litter for use in confined enclosures, consisting essentially of:
 peat compacted to a density to reduce formation of dust when agitating or otherwise disturbing the peat, said peat being formed into fragments of random size and shape and with nominal diameters from about 1/8 of an inch to of less than about 1-3/4 inches, said fragments having a pH of less than seven and a moisture content of at most fifty percent by weight.

Column 8, Claim 19 should read:

19. The process of Claim 12 including the further step of:
 combining said fragments in said random distribution with a highly moisture absorbent, high fiber by-product mixture of food processing to enhance circulation of air through the litter, and wherein said fragments have nominal diameters of at most 1/8 of an inch.

Signed and Sealed this

Twenty-second Day of May, 1990

*Attest:*

HARRY F. MANBECK, JR.

*Attesting Officer*  *Commissioner of Patents and Trademarks*